United States Patent [19]

Tomioka et al.

[11] Patent Number: 4,755,584
[45] Date of Patent: Jul. 5, 1988

[54] POLYESTER CARBONATE CONTAINING IMIDO GROUPS AND METHOD OF PREPARING THE SAME

[75] Inventors: Tatsuya Tomioka, Kisarazu; Shigeru Murakami, Chiba, both of Japan

[73] Assignee: Idemitsu Kosan Company Limited, Tokyo, Japan

[21] Appl. No.: 900,734

[22] Filed: Aug. 27, 1986

[30] Foreign Application Priority Data

Sep. 2, 1985 [JP] Japan .................................. 60-191990

[51] Int. Cl.$^4$ ............................................. C08G 63/62
[52] U.S. Cl. .................................... 528/170; 528/125; 528/126; 528/171; 528/173; 528/203; 528/211
[58] Field of Search ............... 528/170, 125, 126, 171, 528/173, 211, 203

[56] References Cited

U.S. PATENT DOCUMENTS 3,567,685  3/1971  Bialous et al. .................. 528/170
4,393,190  7/1983  Tyrell et al. ..................... 528/170

Primary Examiner—Harold D. Anderson
Attorney, Agent, or Firm—Frishauf, Holtz, Goodman & Woodward

[57] ABSTRACT

Disclosed is a polyester carbonate containing imido groups comprising recurring units represented by the following formula:

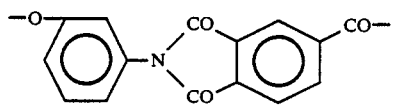

(1)

and recurring units represented by the following formula:

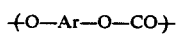

(2)

wherein Ar represents a divalent aromatic hydrocarbon group selected from the group consisting of

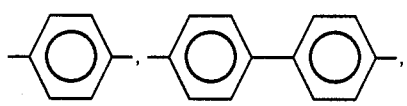

-continued

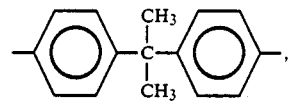

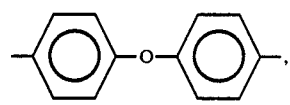

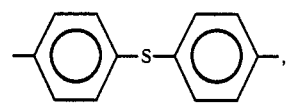

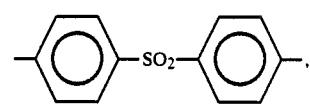

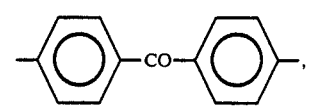

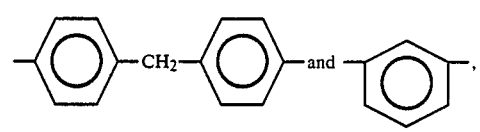

with a mole fraction of the recurring units shown by the formula (1) being 0.2 to 0.8, and having a reduced viscosity [$\eta$sp/C] of 0.3 dl/g or more at 60° C. in a solution in which the polyester carbonate is dissolved in p-chlorophenol as a solvent at a concentration of 0.2 g/dl.

Further disclosed is a process for producing the same which comprises allowing 4-carboxy-N-(3-hydroxyphenyl)-phthalimide to react with a divalent phenol represented by the following formula:

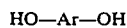

(3)

wherein Ar has the same meaning as above,
and diphenyl carbonate.

The compound of this invention or the compound prepared according to the process of this invention has a higher mechanical strength, good moldability, solvent resistance and liquid crystal characteristic.

5 Claims, No Drawings

POLYESTER CARBONATE CONTAINING IMIDO GROUPS AND METHOD OF PREPARING THE SAME

BACKGROUND OF THE INVENTION

This invention relates to a polyester carbonate containing imido groups which is excellent in mechanical strength and molding processability and also has liquid crystal characteristic and to a process for producing the same.

Polyester carbonates are generally excellent in physical properties such as mechanical properties, heat resistance, chemical resistance, etc., and are useful as the materials for molded product in general for which high strength is not required.

However, a polyester carbonate having a structure known in the art, for example, one having the repeating units of

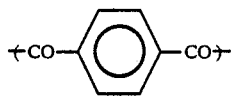

and $+O-Ar-OCO+$ cannot be said to have satisfactory strength as the material for molded products in the field for which high strength is demanded.

An object of the present invention is to avoid the problem as mentioned above and to provide a polyester carbonate which is useful also as the material for molded products in the field for which high strength is demanded.

SUMMARY OF THE INVENTION

The present inventors have studied intensively in order to accomplish the above object. They found that the mechanical strength of polyester carbonate can be improved by introducing imido bonding into the molecular chain of the polyester carbonate and further that such a polyester carbonate is excellent in melting moldability since it exhibits liquid crystal characteristic.

More specifically, the polyester carbonate of the present invention is a polyester carbonate containing imido groups, comprising recurring units represented by the following formula:

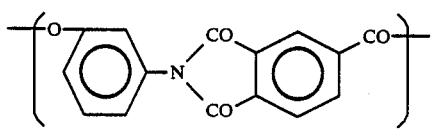 (1)

and recurring units represented by the following formula:

 (2)

wherein Ar represents a divalent aromatic hydrocarbon group, selected from the group consisting of

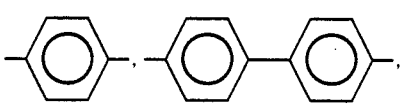

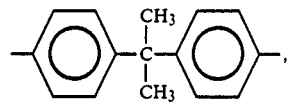

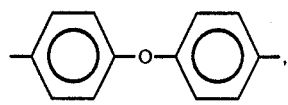

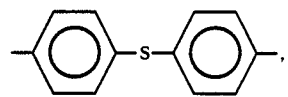

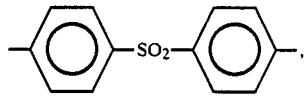

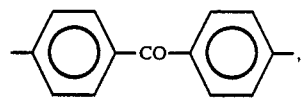

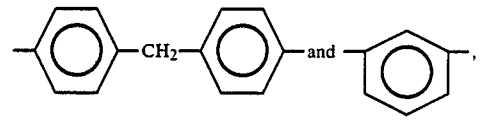

with the mole fraction of the recurring units shown by the formula (1) being 0.2 to 0.8, and having a reduced specific viscosity [$\eta$ sp/C] of 0.3 dl/g or more at 60° C. in a solution in which the polyester carbonate is dissolved in p-chlorophenol as a solvent at a concentration of 0.2 g/dl, and its preparation method comprises allowing 4-carboxy-N-(3-hydroxyphenyl)phthalimide to react with a divalent phenol represented by the following formula:

HO—Ar—OH (3)

wherein Ar has the same meaning as mentioned above, and diphenyl carbonate.

DESCRIPTION OF THE PREFERRED EMBODIMENTS

The polyester carbonate of the present invention is constituted of one unit represented by the formula (1) or a linked member consisting of a plurality of this unit and one unit represented by the formula (2) or a linked member consisting of a plurality of this unit linked in a straight chain to each other disorderly or orderly.

The ratio of the number of unit of the formula (1) to the number of unit of the formula (2) in the polyester carbonate of the present invention is required to be set as follows. That is, the mole fraction of the unit of the formula (1) (the mole fraction as herein mentioned is represented by $$\frac{a_1}{a_1 + a_2}$$

when the moles of the unit of the formula (1) are defined as $a_1$ and the moles of the unit of the formula (2) as ($a_2$) should be set at 0.2 to 0.8. When the mole fraction of the unit of the formula (1) is less than 0.2, the temperature region exhibiting liquid crystal chracteristic is so high that the molding temperature becomes undesirably higher. On the other hand, when the mole fraction exceeds 0.8, no liquid crystal characteristic is exhibited resulting in remarkably lower moldability.

Preferably, the mole fraction is 0.3 to 0.6.

And, the terminal ends of the polyester carbonate of the present invention are blocked with hydrogen atom, carboxyl group,

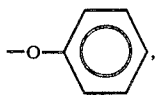

etc.

The polyester carbonate of the present invention has a molecular weight such that, when the imido containing polyester carbonate is dissolved in p-chlorophenol at a concentration of 0.2 g/dl, the reduced viscosity of this solution [$\eta$ sp/C] at 60° C. is 0.3 dl/g or more. If the reduced viscosity is less than 0.3 dl/g, the copolymer obtained has no sufficient mechanical strength.

The polyester carbonate of the present invention is prepared as follows: 4-carboxy-N-(3-hydroxyphenyl)-phthalimide represented by the following formula:

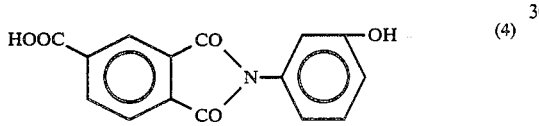 (4)

is allowed to react with a divalent phenol represented by the above formula (3) and diphenyl carbonate represented by the following formula:

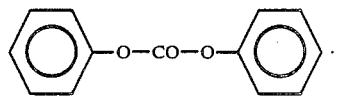 (5)

The compound of the formula (4) can be synthesized from, for example, trimellitic anhydride and m-aminophenol.

In the divalent phenol represented by the formula (2) and (3), Ar represents a divalent aromatic hydrocarbon group which is at least one selected from the group consisting of

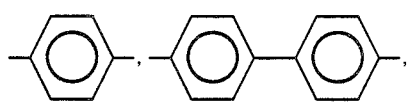

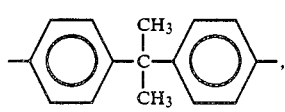

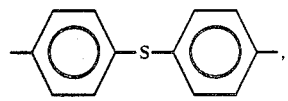

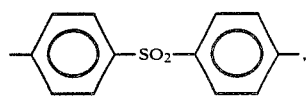

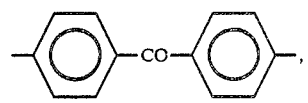

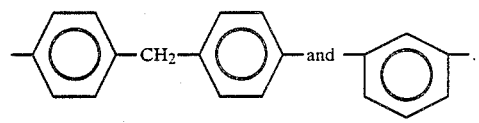

Among them,

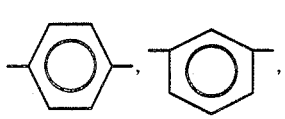

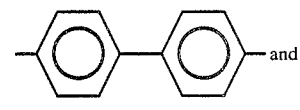

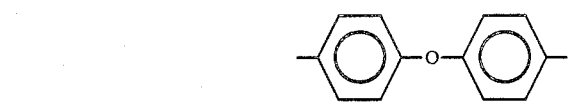

are preferred.

As to the amounts of the respective compounds to be used, the amounts of the compound of the formula (4) and the compound of the formula (3) are required to be set so as to satisfy the mole fraction as specified above. That is, when the amount of the compound of the formula (4) used is defined as $b_1$ mole and that of the compound of the formula (3) as $b_2$ mole, the relationship of $$\frac{b_1}{b_1 + b_2} = 0.2 \text{ to } 0.8$$

may be satisfied. On the other hand, the amount of the compound of the formula (5) used may be equimolar amount to two-fold molar amount to ($b_1+b_2$) in terms of molar ratio.

The reaction should preferably be carried out in the presence of a catalyst. Such catalysts may include single metal such as sodium, potassium, calcium, magnesium, zinc, manganese, cobalt, titanium, tin, anitmony, etc., and oxides, hydroxides, hydrides, halides, alcoholates and phenolates of these.

In the present invention, the reaction should preferably be conducted at a temperature of 200° to 400° C., more preferably 250° to 350° C. The reaction time may be 0.1 to 5 hours, preferably 1 to 2 hours. Concerning the reaction method, there may be employed the method in which melt polymerization is performed under normal pressure and then continued under reduced pressure or the method in which solution polymerization is carried out in a hot medium oil under normal pressure.

EXAMPLE 1

Into a flask equipped with a stirring means and a pipe for introducing argon gas, 11.3 g (0.04 mole) of 4-carboxy-N-(3-hydroxyphenyl)-phthalimide, 11.2 g (0.06 mole) of 4,4'-dihydroxy diphenyl and 25.7 g (0.12 mole) of diphenyl carbonate were charged. Subsequently, 0.01 ml (0.03 m mole) of tetra-n-butoxytitanium was added to these, and the reaction was carried out at an elevated temperature of 250° C. under argon gas stream for 1 hour. Next, after the temperature was raised to 280° C., the flask was brought to a reduced pressure of 1 mmHg and the reaction was carried out for 1 hour. Further, at a temperature elevated up to 300° C., the reaction was carried out for 1 hour.

The polymer thus obtained was found to have a reduced viscosity [$\eta$ sp/C] of 0.63 dl/g in a solution of 0.2 g/dl concentration in a solvent of p-chlorophenol at 60° C.

A film was prepared by press molding by use this polymer, and IR-ray absorption spectral (IR) analysis was conducted by use of this film. As the result, absorptions based on benzene ring at the positions of 1580 $cm^{-1}$ and 1490 $cm^{-1}$, absorption based on carbonyl group at the position of 1650 $cm^{-1}$, absorptions based on imido bonding at the positions of 1780 to 1680 $cm^{-1}$, absorption based on the ether bonding at the position of 1240 $cm^{-1}$ and the imido characteristic absorption at the position of 720 $cm^{-1}$ were recognized, respectively.

Next, solvent resistance of this polymer was examined and it was found that the polymer was insoluble in solvents such as ethyl alcohol, diethyl ether, acetone, chloroform, methylene chloride, xylene and toluene.

For examination of the melting moldability of this polymer, the melt index under a load of 2.16 kg at 250° C. was measured to obtain the result as shown in the Table. Further, this polymer was confirmed to exhibit liquid crystal characteristic at a temperature of 250° C. or higher.

Also, for examination of the thermal properties of this polymer, the glass transition temperature and the thermal decomposition initiating temperature were measured to obtain the results as shown in the Table.

Next, for examination of the mechanical properties of this polymer, a fiber was prepared. That is, by use of the polymer obtained, a fiber was spun through a spinning nozzle with a diameter of 1 mm at 350° C. The fiber with a diameter of 40 um obtained was examined for its mechanical properties to obtain the results as shown in the Table.

EXAMPLE 2

A polymer was prepared in the same manner as in Example 1 except for changing the amount of 4-carboxy-N-(3-hydroxyphenyl)-phthalimide used to 17.0 g (0.06 mole) and the amount of 4,4'-dihydroxy diphenyl used to 7.4 g (0.04 mole).

The polymer obtained was found to have a reduced viscosity [$\eta$ sp/C] of 0.36 dl/g, and the results of IR-ray absorption spectral analysis, solvent resistance, liquid crystal characteristic were the same as Example 1. Other measurement results are listed in the Table.

EXAMPLE 3

A polymer was prepared in the same manner as in Example 1 except for using 6.67 g (0.06 mole) of hydroquinone in place of 11.2 g (0.06 mole) of 4,4'-dihydroxy diphenyl used in Example 1. The polymer obtained was found to have a reduced viscosity [$\eta$ sp/C] of 0.31 dl/g, and the results of IR-ray absorption spectral analysis, solvent resistance, liquid crystal characteristic were the same as Example 1. Other measurement results are listed in the Table.

EXAMPLE 4

A polymer was prepared in the same manner as Example 1 except for using 9.3 g (0.05 mole) of 4,4'-dihydroxy diphenyl and 2.0 g (0.01 mole) of 4,4'-dihydroxy diphenyl ether in place of 4,4'-dihydroxy diphenyl used in Example 1. The polymer obtained was formed to have a reduced viscosity [$\eta$ sp/C] of 0.45 dl/g, and the results of IR-ray absorption spectral analysis, solvent resistance, liquid crystal characteristic were the same as in Example 1. Other measurement results are listed in the Table.

COMPARATIVE EXAMPLE 1

A polyester carbonate having a structure known in the art was prepared in the same manner as in Example 1 except for using 11.2 g (0.06 mole) of 4,4'-dihydroxy diphenyl, 5.52 g (0.04 mole) of p-hydroxybenzoic acid and 25.7 g (0.12 mole) of diphenyl carbonate. The polymer obtained was found to have a reduced viscosity [$\eta$ sp/C] of 0.52 dl/g.

For the polymer obtained, thermal properties and melt index were measured and also a fiber was spun similarly as in Example 1 and its mechanical properties were measured to obtain the results as shown in the Table.

TABLE

| | Thermal properties | | | Mechanical properties of fiber | | |
|---|---|---|---|---|---|---|
| | Glass transition temperature (°C.) | Thermal decomposition initiation temperature (°C.) | Moldability Melt index (g/10 min.) | Tensile strength (kg/cm$^2$) | Tensile modulus (kg/cm$^2$) | Elongation (%) |
| Example 1 | 150 | 434 | 4.4 | 2,400 | 246,000 | 3.0 |
| Example 2 | 176 | 435 | 1.5 | 1,800 | 61,000 | 1.5 |
| Example 3 | 130 | 430 | 5.0 | 2,000 | 90,000 | 3.5 |
| Example 4 | 145 | 432 | 3.2 | 2,520 | 127,000 | 4.5 |
| Comparative example 1 | 140 | 400 | 2.5 | 1,300 | 35,000 | 5.0 |

As can be clearly seen from the above Examples of the present invention, the polyester carbonate containing imido groups of the present invention has higher mechanical strength than the polyester carbonate with a structure of the prior art, yet having good moldability as well as solvent resistance, and also exhibits liquid crystal characteristic. Accordingly, its industrial value is great when applied for materials such as various fibers, films, etc., in the field where high strength is required.

We claim:

1. A process for producing a polyester carbonate containing imido groups comprising recurring units represented by the following formula:

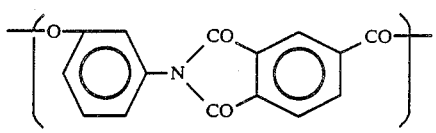

(1)

and recurring units represented by the following formula:

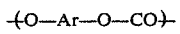

(2)

wherein Ar represents a divalent aromatic hydrocarbon group selected from the group consisting of

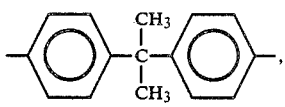

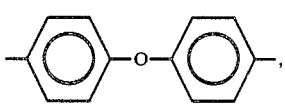

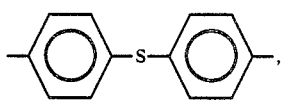

-continued

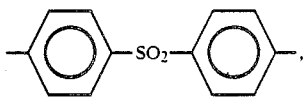

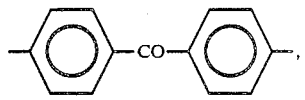

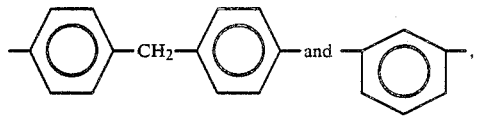

with a mole fraction of the recurring units shown by the formula (1) being 0.2 to 0.8, and having a reduced viscosity [η sp/C] of 0.3 dl/g or more at 60° C. in a solution in which the polyester carbonate is dissolved in p-chlorophenol as a solvent at a concentration of 0.2 g/dl, which comprises reacting 4-carboxy-N-(3-hydroxyphenyl)-phthalimide with a divalent phenol represented by the following formula:

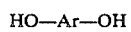 (3)

wherein Ar has the same meaning as above, and diphenyl carbonate in the presence of a catalyst selected from the group consisting of sodium, potassium, calcium, magnesium, zinc, manganese, cobalt, titanium, tin and antimony, and oxides, hydroxides, hydrides, halides, alcoholates and phenolates thereof.

2. The process for producing a polyester carbonate containing imido groups according to claim 1, wherein the mole fraction of 4-carbonyl-N-(3-hydroxyphenyl)-phthalimide is from 0.2 to 0.8 to the total amount of 4-carbonyl-N-(3-hydroxyphenyl)-phthalimide and divalent phenol.

3. The process for producing a polyester carbonate containing imido groups according to claim 1, wherein the amount of diphenyl carbonate is between equimolar amount and two-fold molar amount to 4-carbonyl-N-(3-hydroxyphenyl)-phthalimide and divalent phenol.

4. The process for producing a polyester carbonate containing imido groups according to claim 1, wherein said reaction is carried out at a temperature range of from 200° C. to 300° C.

5. The process of claim 1 wherein said mole fraction is 0.3 to 0.6.

* * * * *